(12) United States Patent
Batz et al.

(10) Patent No.: US 12,544,939 B2
(45) Date of Patent: Feb. 10, 2026

(54) TOOL COUPLING DEVICE, TOOL COUPLING DEVICE SET, ROBOT AND MANUFACTURING OR HANDLING SYSTEM

(71) Applicant: IPR—Intelligente Peripherien für Roboter GmbH, Eppingen (DE)

(72) Inventors: Roman Batz, Eppingen (DE); Marc Engelhart, Sinsheim (DE); Helge Schneider, Brackenheim (DE)

(73) Assignee: IPR—Intelligente Peripherien für Roboter Gmb, Eppingen (DE)

( * ) Notice: Subject to any disclaimer, the term of this patent is extended or adjusted under 35 U.S.C. 154(b) by 53 days.

(21) Appl. No.: 18/299,933

(22) Filed: Apr. 13, 2023

(65) Prior Publication Data

US 2024/0342926 A1 Oct. 17, 2024

(51) Int. Cl.
*B25J 15/04* (2006.01)
*B25J 9/00* (2006.01)

(52) U.S. Cl.
CPC ......... *B25J 15/0416* (2013.01); *B25J 9/0084* (2013.01)

(58) Field of Classification Search
CPC ...... B25J 9/0084; B25J 15/04; B25J 15/0408; B25J 15/0416
See application file for complete search history.

(56) References Cited

U.S. PATENT DOCUMENTS

| | | | | |
|---|---|---|---|---|
| 4,830,569 A | * | 5/1989 | Jannborg | B25J 19/0041 901/41 |
| 4,913,617 A | * | 4/1990 | Nicholson | B25J 9/0084 901/29 |
| 2007/0228670 A1 | * | 10/2007 | Norton | B25J 15/04 279/2.11 |
| 2017/0144230 A1 | * | 5/2017 | Rosso | B23B 31/4046 |
| 2017/0232620 A1 | * | 8/2017 | Kalb | B25J 15/0416 279/2.09 |
| 2018/0304475 A1 | * | 10/2018 | Zachary | B25J 15/0416 |
| 2022/0024055 A1 | * | 1/2022 | Bellandi | B25J 15/0416 |
| 2024/0424579 A1 | * | 12/2024 | Takebayashi | B25J 15/0416 |

FOREIGN PATENT DOCUMENTS

| | | | | |
|---|---|---|---|---|
| DE | 102021121113 B3 | * | 11/2022 | ......... B25J 15/0416 |
| JP | 2010105111 A | * | 5/2010 | ............ B25B 5/068 |

OTHER PUBLICATIONS

English translation of DE-102021121113-B3 (Year: 2022).*
English translation of JP-2010105111-A (Year: 2010).*

* cited by examiner

Primary Examiner — Joseph Brown
(74) Attorney, Agent, or Firm — FLYNN THIEL, P.C.

(57) ABSTRACT

Tool coupling device with two coupling subdevices, wherein one of the coupling subdevices is intended for the distal end of a robot arm, and the other coupling subdevice is intended to be provided on a tool which can be coupled to the robot arm. The coupling subdevices are uncouplable from and to each other for the purpose of tool changing. A first of the coupling subdevices has a coupling socket extending in a coupling direction for insertion into a coupling recess of a second coupling subdevice. A plurality of ball channels are provided, within each of which a ball body is arranged as a locking body. The ball bodies are movable between a radially extended coupling position and a radially retracted release position. An actuating body for securing the ball bodies in the extended position is displaceable by an electric motor or a manual control lever.

13 Claims, 10 Drawing Sheets

TOOL COUPLING DEVICE, TOOL COUPLING DEVICE SET, ROBOT AND MANUFACTURING OR HANDLING SYSTEM

TECHNICAL FIELD AND BACKGROUND

The invention relates to tool coupling devices for coupling tools to the robot arm of a robot, and to tool coupling device sets comprising such tool coupling devices. Furthermore, the invention also relates to a robot having such a tool coupling device and to a manufacturing or handling system having a plurality of robots with tool coupling devices.

Known tool coupling devices are used in order to be able to change tools quickly and with little effort, i.e., to be able to separate the tools from a robot arm of an industrial robot in order to be able to subsequently couple and lock another tool to the robot arm or to attach the separated tool to a robot arm of another robot.

Both pneumatic and manually operated tool coupling devices are known from the prior art. However, fundamentally different tool coupling devices are usually used for this purpose. Changing a tool intended for a pneumatically controlled tool coupling device to a robot intended for manual tool changing therefore usually causes great effort.

SUMMARY

A tool coupling device is provided which can be operated more economically than known systems, in particular by increasing the flexibility of use and thus reducing the number of tools to be kept in stock.

A tool coupling device with two coupling subdevices is proposed. One of the coupling subdevices is intended to be located at the distal end of a robot arm of a robot, i.e., fastened there, in particular by a screw connection. The other coupling subdevice is intended to be provided on a tool that can be coupled to the robot arm. This can be a gripper, a cutting tool or a discharge head for liquids, for example. Here, too, the coupling part device is usually attached to the mold by a screw connection.

Generally, it is not important which of the coupling subdevices is provided on the tool side and which on the robot arm side. Insofar as specifications are made in this respect in the following, these are to be understood as exemplary.

The two coupling subdevices of a tool coupling device can be decoupled from each other and coupled to each other for the purpose of tool changing. Changing a tool is required when the robot is to be equipped with another tool or when the tool shall be used on another robot. Maintenance or cleaning of the tool can also be a reason for an intermediate decoupling.

For the purpose of easy coupling and decoupling, the coupling subdevices have cooperating coupling mechanisms. A first of the coupling subdevices, which may be the robot-side coupling subdevice or the tool-side subdevice, has a coupling socket extending in a coupling direction for the purpose of insertion into a corresponding coupling recess of the other and second coupling subdevice.

In order to lock the two coupling subdevices together and then to be able to guide the tool by the robot arm, the first coupling subdevice has a plurality of ball channels on the coupling socket, in each of which a ball body being arranged as a locking body.

Preferably, at least four ball channels are provided, each of which is provided with a ball body. Preferably, the ball channels are designed with different orientations. In a particular preferable embodiment, the ball channels are distributed over the rotationally symmetrical coupling socket and extend radially outwardly, the ball channels preferably being distributed uniformly over the circumference.

The ball bodies are displaceable in the ball channels between an extended coupling position and a retracted release position. For displacement of the ball bodies, the first coupling subdevice has an internal actuating body. The internal actuating body is movable relative to the coupling socket and the ball channels and acts directly or indirectly on the ball bodies. When the actuating body is displaced into a coupling end position, the actuating body presses and holds the ball bodies outwardly into an extended coupling position in each case and prevents the ball bodies from retracting. This configuration creates a locked state.

The actuating body preferably has a widening shape and, in particular, is rotationally symmetrical on an outer side thereof. In particular, the actuating body can have the shape of at least one cone section in the region of an actuating surface that acts on the ball bodies.

For interaction with the ball bodies, the second coupling subdevice has at least one retaining edge on the inner side of the coupling recess. When the coupling subdevice is inserted into the coupling recess and if the ball bodies are radially extended and are secured by the actuating body, the radially extended ball bodies together with the retaining edge secure the coupled state of the coupling subdevices and prevent separation of the coupling subdevices.

To separate the coupling subdevices from each other again, the actuating body is moved out of the coupling end position so that the ball bodies can move inwards in the ball channels again, thus terminating the locked state. The coupling subdevices can now be separated from each other again.

According to a first aspect, the displacement of the actuating body is performed by an electric motor. The electric motor is part of the first coupling subdevice and is mechanically connected to the actuating body in order to be able to move the actuating body into the coupling end position and out of the coupling end position.

The electric motor can be designed as a linear actuator. However, an electric motor with a rotatable output shaft coupled to the actuating body via a gear unit is preferred. Preferably, the gear unit can be designed to convert the rotational movement of the output shaft into a translational movement in order to directly displace the actuating body or to move a translationally displaceable control element, the movement of which is directly or indirectly converted into the movement of the actuating body.

Preferably, the gear unit represents a self-locking safety device with respect to an effect direction from the actuating body to the electric motor. In this embodiment, the gear unit is designed in such a way that a force acting on the actuating body results in self-locking in the gear unit and the force is thus not passed on to the electric motor. If the electric motor fails, this does not result in the secured state of the coupling subdevices being lost.

It is particularly advantageous if the gear unit comprises a worm gear. The worm gear can be in direct engagement with an internal thread on the actuating body or with the linearly movable intermediate element. The gear worm is an advantageous way of providing the above-mentioned self-locking effect in the direction of action from the actuating body to the electric motor.

In a preferred variant, a spring device is provided on the first coupling subdevice, by which the actuating body is permanently pressed in the direction of the coupling end position. Since the electric motor preferably acts centrally on the actuating body on a side of the actuating body opposite the actuating surface, the spring device preferably comprises a plurality of spring elements acting on the actuating body, the plurality of spring elements being distributed over the circumference thereof.

The spring device can serve in particular the purpose of maintaining the locked state in the event of a failure of the electric motor. In this way, safety is ensured even in case of the gear unit and/or the electric motor not providing a self-locking effect.

According to a second aspect, the tool coupling device is not, or not exclusively, operable by the electric motor, but comprises an external manual control lever for manual operation.

Thus, it is provided here that the establishment of the secured state and the released state is performed by a manual actuation of the manual control lever directly at the tool coupling device. This embodiment represents a simple and cost-effective way of implementing a tool coupling device.

The manual control lever is preferably designed as a pivotable manual control lever. The manual control lever is preferably pivotably mounted on the first coupling subdevice, preferably in the region of an outer contour. In a particular preferable embodiment, a pivot axis about which the manual control lever is pivotable extends parallel to the coupling direction. Preferably, the manual control lever has a curved or angled shape so that the lever fits against the outside of a housing of the first coupling subdevice in a space-saving manner when the actuating body is in the coupling end position. By swinging the manual control lever outwardly from this position, the actuating body can be moved out of the coupling end position.

In this variant with a manual control lever, a preferred design can also provide that a spring device is provided on the first coupling subdevice, by which the actuating body is permanently force-loaded in the direction of the coupling end position. Such a spring device reduces the risk of dangerous incorrect operation. Even if, during a tool change, the manual control lever is not pressed into the position assigned to the coupling end position of the actuating body, the spring acts in this direction and ensures a safe coupling between the coupling subdevices. If decoupling of the coupling subdevices is intended, the manual control lever is displaced out of the end position against the force of the spring device. The force required to release the coupling is therefore greater than the force required to couple the coupling component devices.

A holding device can be provided to ensure that the manual control lever remains in the position the manual control lever has reached after the manual control lever has been pivoted, despite the spring force.

For both the design of the first coupling subdevice with electric motor and for the design with manual control lever, it is preferred that the electric motor or the manual control lever act first on a linearly movable control element and that the movement of the control element acts indirectly via a direction changing gear unit on the actuating body, preferably on a region of the actuating body opposite the actuating surface of the actuating body. The linearly movable control element is preferably movable in a guided manner, a direction of movement relative to the direction of movement of the actuating body preferably enclosing an angle greater than 0°, in particular greater than 10°, and preferably an angle of 90°.

In particular, two designs for such a direction changing gear unit are preferred, with both designs being usable for a design with a manual control lever as well as for a design with an electric motor. In a first design, the direction changing gear unit is designed as a link gear unit. In the first design, a rigid link is provided as an intermediate element, which is pivotably attached to both the control element and pivotably attached to the actuating body. The displacement of the control element thus leads to a displacement of the swivel axis and thus to a tilting of the link, which thereby displaces the actuating body and finally secures the ball bodies.

When the actuating body reaches the coupling end position, the link is preferably in a position that is not angled or only slightly angled relative to the direction of movement of the actuating body. Therefore, an imaginary connecting line between the two pivot axes of the link with the direction of movement encloses an angle of less than 30°, preferably less than 10°. This is very suitable for achieving the self-locking effect described above.

In a second design using a direction changing gear unit, the design provides that the direction changing gear unit has a guide surface on the actuating body which is inclined with respect to the direction of movement of the control element, in particular enclosing an angle of between 5° and 40° with the direction of movement of the control element, and in a particular preferable embodiment between 5° and 30°. Alternatively or additionally, a guide surface can also be provided on the control element, which has such an angle with respect to the direction of movement of the control element.

With such a design, the continued movement of the control element presses the actuating body in the direction of the coupling end position and finally into the coupling end position. If the control element is displaced in the opposite direction, this restores the freedom of movement of the actuating body and the actuating body can be pushed out of the coupling end position under the application of force by the ball bodies.

The two variants of the first coupling subdevice described here, i.e., the variant with a preferably pivotable manual control lever and the variant with an electric motor, can be designed with an identically dimensioned coupling socket. This makes it possible to couple the second coupling subdevice, which is preferably provided on the side of the tool, with both possible first coupling subdevices as desired.

In addition, a pneumatic variant of the first coupling subdevice is also conceivable, which also has the described coupling extension and the ball bodies and which permits displacement of the actuating body to the coupling end position by air pressure. A uniform second coupling subdevice could be coupled with all three variants of the first coupling subdevice.

This offers a high degree of flexibility in operation. For example, a robot where frequent tool changes are planned may use the electric or pneumatic variant, while on a robot that uses the same tool for a longer period of time, the manual variant with a manual control lever is appropriate. The tools, including the second subdevices attached to each of the tools, can be freely interchanged between the different robots. This reduces the overall requirement for tools to be kept available on the shop floor.

One further aspect therefore also relates to a system for manufacturing or handling workpieces using the described principle.

The system comprises at least two robots, each having at least one robot arm. Typically, the number of robots is greater than two. Ideally, all robots of the system, which are occasionally equipped with the same tools, are designed in the following manner.

The at least two robot arms of the at least two robots are each provided with a coupling subdevice which is designed for coupling at least one tool with a third coupling subdevice, so that the at least one tool can be coupled to each of the coupling subdevices of the at least two robot arms.

In the manner described above, the coupling subdevices on the robot arms each have a coupling socket with a plurality of ball channels, within each of which a ball body is arranged, the ball bodies being movable between a radially extended coupling position and a radially retracted release position.

The coupling subdevices on the robot arms each have an internal actuating body which is displaceable relative to the coupling socket and which, in a coupling end position, presses the plurality of ball bodies into the radially extended coupling position, so that, interacting with a retaining edge on the inner side of the coupling recess of the coupling subdevice on the tool, the coupling subdevices on the robot arms can be coupled alternately to the at least one tool and the latter can be locked via the ball bodies.

The coupling subdevices on the robot arms represent at least two variants of the total of three variants of coupling subdevices, i.e., the variant with electric motor for displacement of the actuating body, the variant with manual control lever for displacement of the actuating body and the variant with pneumatic displacement of the actuating body.

In addition to the system in which at least two coupling subdevices with different types of actuation are used, a tool coupling device set is proposed which comprises the necessary coupling subdevices for such a system.

Such a tool coupling device set has at least three coupling subdevices, of which at least two coupling subdevices are intended for attachment to the distal end of a robot arm and of which a further coupling subdevice is intended to be attached to a tool which can be coupled to the robot arm.

The coupling subdevices for intended use at the end of the robot arm each have a coupling socket of the type described above for insertion into a coupling recess of the further coupling subdevice, with ball channels in which a ball body is provided, and an internal actuating body which can be displaced with respect to the coupling socket and which, in a coupling end position, presses the plurality of ball bodies into the radially extended coupling position.

The third coupling subdevice of the tool coupling device set represents the counterpart to the two coupling subdevices mentioned above. The third coupling subdevice has a coupling recess as well as at least one retaining edge for cooperating with the ball bodies, the ball bodies of the at least two previously mentioned coupling subdevices cooperating with the retaining edge to establish the coupled and locked state.

As already explained in the context of the manufacturing or handling system, the at least two coupling subdevices are designed for intended use at the end of the robot arm for different types of actuation, wherein one of these coupling subdevices is designed for actuation by an electric motor and one of the coupling subdevices is designed for manual actuation, or wherein one of the coupling subdevices is designed for actuation by an electric motor and one of the coupling subdevices is designed for pneumatic actuation, or wherein one of the coupling subdevices is designed for manual actuation and one of the coupling subdevices is designed for pneumatic actuation.

BRIEF DESCRIPTION OF THE DRAWINGS

Further advantages and aspects of the invention result from the claims and from the following description of preferred embodiments, which are explained below with reference to the figures.

DETAILED DESCRIPTION

Figure 1:
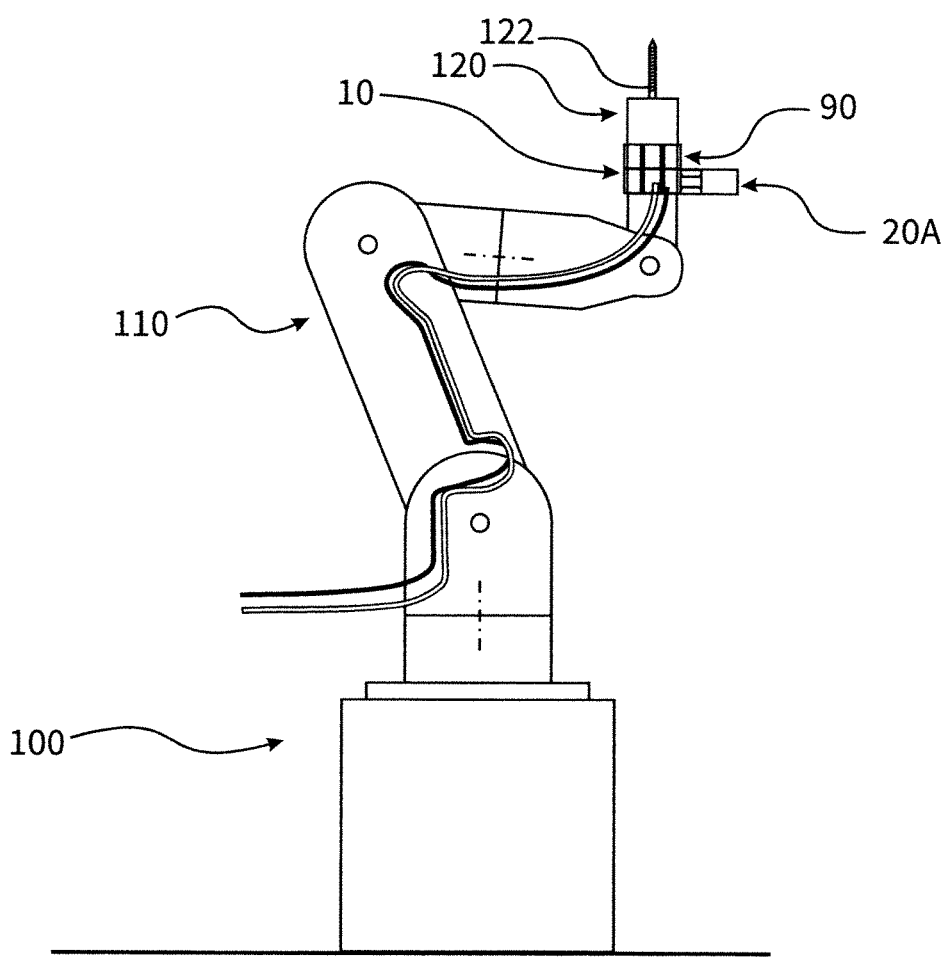
FIG. 1 shows a robot with a tool coupled and locked via a tool coupling device.

FIG. 1 shows an industrial robot 100 which has a robot arm 110 movable about a plurality of axes, at the end of which a tool 120 is provided, in this example a drilling tool 120 with a drill 122.

The tool 120 is attached to the robot arm 110 by a tool coupling device 10, wherein the tool coupling device 10 comprises a coupling subdevice 20A on the robot arm side and a coupling subdevice 90 on the tool side. During operation, the coupling subdevices 20A, 90 are coupled and locked to each other.

If a different tool is required, the tool coupling device 10 permits easy changing. By an unlocking process explained below, the coupling subdevices 20A, 90 get in an unlocked state in which the tool together with the coupling subdevice 90 can be released from the robot arm 110 and the coupling subdevice 20A. Removal of the tool 120 may be performed manually. Preferably, however, the robot arm 110 is moved to the area of a tool magazine not shown, the tool 120 is placed in a receptacle, and then the unlocking and separation takes place there.

Figure 2:
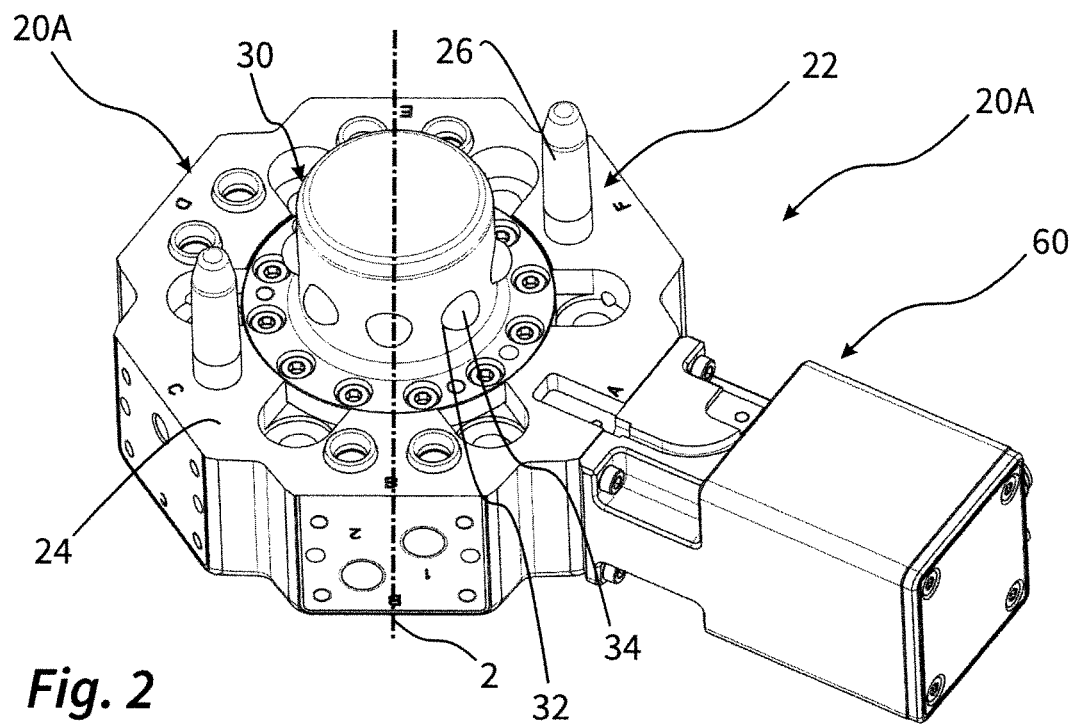
FIGS. 2 to 5 show a coupling subdevice of a tool coupling device with electrical actuation, and a modification thereof.
Figure 3:
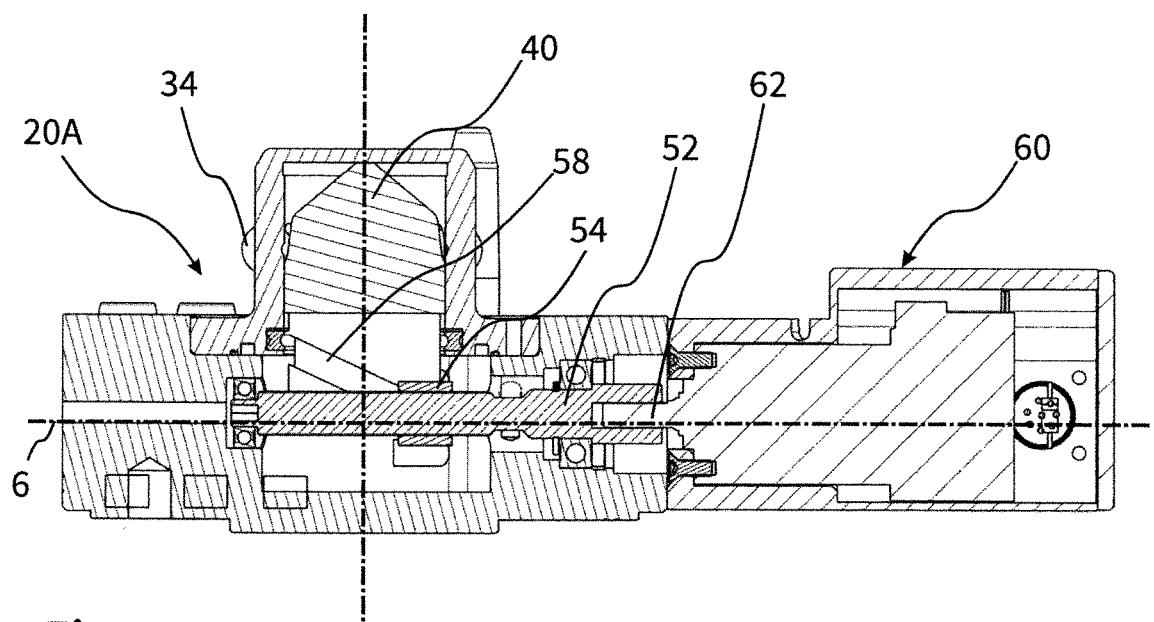
Figure 4:
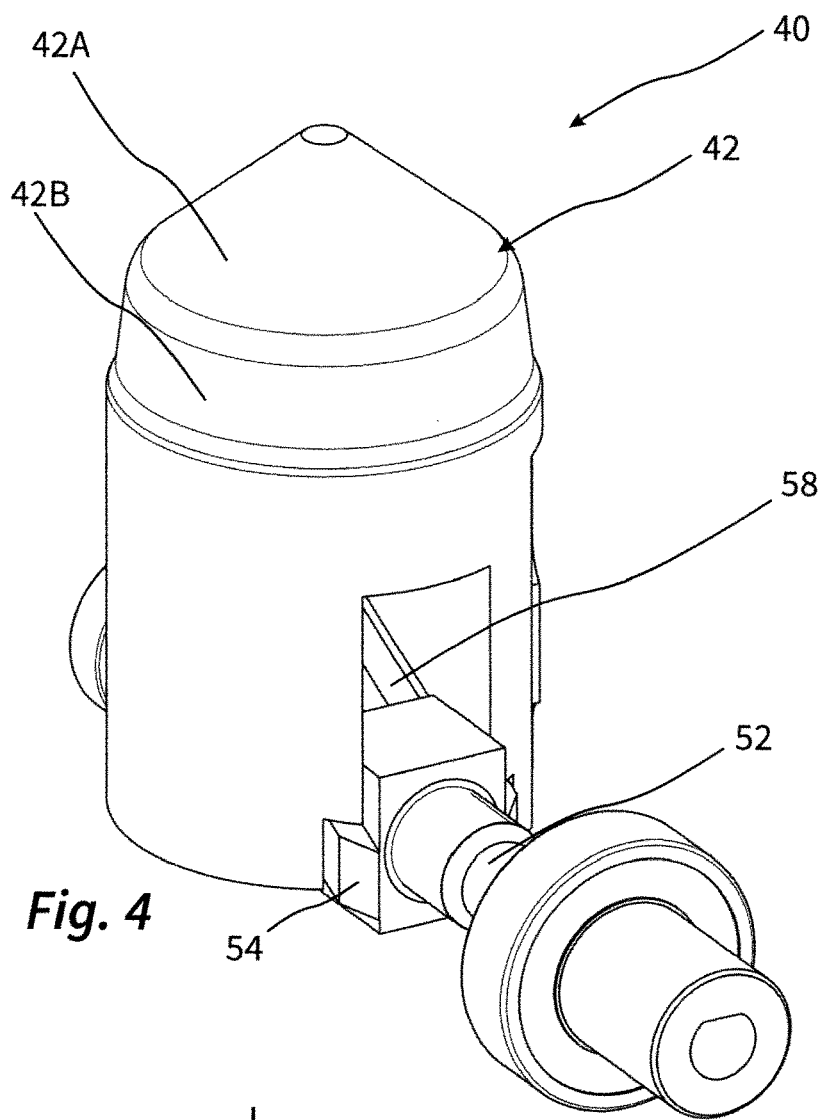

FIGS. 2 to 4 show a first variant of a coupling subdevice 20A on the robot arm side. The first variant of the coupling subdevice 20A has a housing 22, which has an abutment surface 24 on an upper side thereof. Centrally on the abutment surface 24, a cylindrical coupling socket 30 is provided which rises above the surrounding abutment surface 24 in a coupling direction 2. In addition to the centric coupling socket 30, the coupling subdevice 20A also has two alignment pins 26 extending from the abutment surface 24 in the coupling direction.

The wall of the coupling socket 30 is penetrated by a total of eight ball channels 32, in each of which a ball body 34 is arranged. The ball bodies 34 are arranged movably in the ball channels 32 in the radial direction. In the illustrated extended position, the ball bodies 34 are in the outer end position and in this state project beyond the outer contour of the coupling socket 30. In a retracted position, on the other hand, the ball bodies 34 are displaced inwards so that the ball bodies 34 do not project beyond the outer contour of the coupling socket 30 or project beyond the outer contour of the coupling socket 30 to a reduced extent.

The ball bodies 34 serve the purpose of locking the coupling subdevice 20A to the coupling subdevice 90. If the ball bodies 34 are in the radially outer end position and are secured there, a locked state is thereby established. If, on the other hand, the ball bodies 34 are pressed radially inwards or radially inwards, the unlocked state is reached in which the coupling subdevices 20A, 90 can be separated from one another.

In order to bring the ball bodies 34 into the radially extended position for the purpose of locking and to secure the ball bodies 34 there, an actuating body 40 is provided inside the coupling socket 30, which is displaceable in a direction of movement 2 parallel to the coupling direction 2. The actuating body 40 has a rotationally symmetrical actuating surface 42 which is divided into two cone section surfaces 42A, 42B having different angles of inclination with respect to the direction of movement 2.

When the actuating body 40 is displaced upwardly with respect to the orientation of FIGS. 2 and 3, the actuating body 40 pushes the ball bodies 34 radially outwardly to the radially outer end position defined by the shape of the ball channels 32, in which the ball bodies radially project beyond the outer contour of the coupling socket 30, thereby achieving locking in a manner to be described below.

The displacement of the actuating body 40 in the direction of displacement 2 is effected in the case of variant 20A of FIGS. 2 to 4 by an electric motor 60. The electric motor 60 is arranged in a radially outwardly projecting housing which is fastened to the housing 22. An output shaft 62 of the electric motor 60 points radially inwardly in the direction of the actuating body 40. A gear worm 52 of a gear unit is attached to the output shaft 62 in a rotationally fixed manner and a nut 54 is screwed on the gear worm 52. The nut 54 forms a linearly movable control element 54, which can be displaced horizontally with respect to FIG. 3, by the electric motor 60.

The control element 54 in turn interacts with the actuating body 40. As can be seen in particular from FIGS. 3 and 4, the actuating body 40 has an opening, on the inside of which guide grooves with inclined guide surfaces 58 are provided. The control element 54 engages in the guide grooves and can thereby effect a displacement of the actuating body 40 by linear displacement.

The guide surfaces 58 are preferably angled such that displacement of the control element 54 cannot be achieved by application of force by the actuating body 40. Even if the ball bodies 34 are pressed inward with high force and if the actuating body 40 is pressed downward in response thereto, the control element 54 is prevented from being displaced horizontally as a result thereof by self-locking. Thus, if the electric motor 60 fails, the tool coupling device 10 is held in the locked state.

Figure 5:
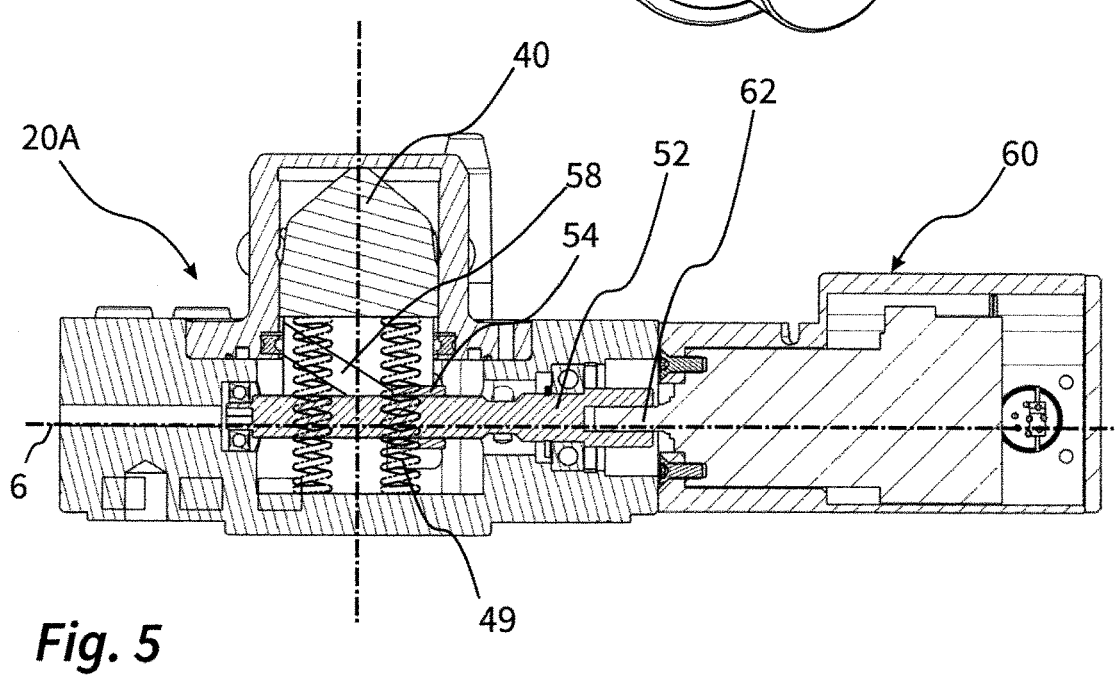

FIG. 5 shows an alternative version in which the inclination of the guide surfaces 58 is greater and thus, depending on the choice of material, no self-locking is achieved. Instead, however, in this design, a spring device 49 is provided, comprising a plurality of springs by which the actuating body 40 is pressed into the upper end position. In such a design, if the electric motor fails or another element of the coupling subdevice breaks, the spring device 49 will hold the actuating body 40 in the locking position.

Figure 6:
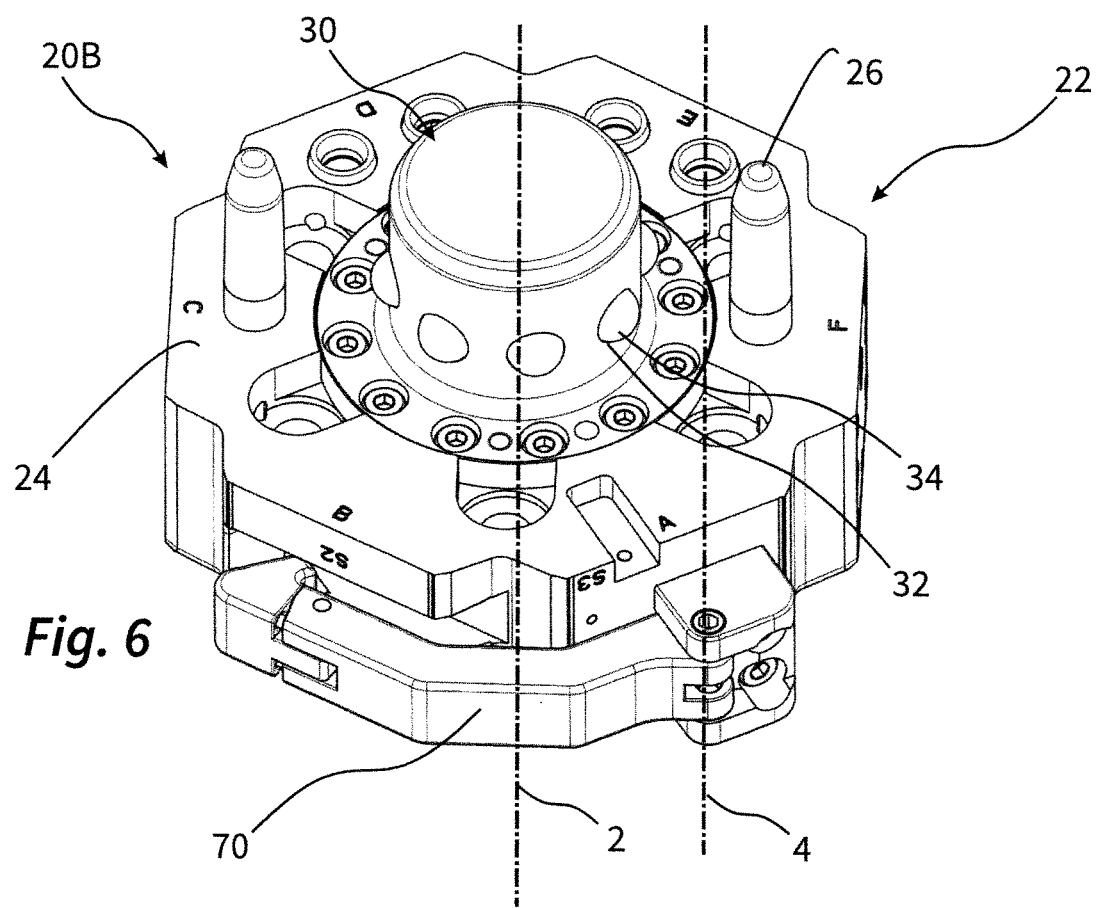
FIGS. 6 to 9 show a coupling subdevice of a tool coupling device for manual actuation as well as a modification thereof.
Figure 7:
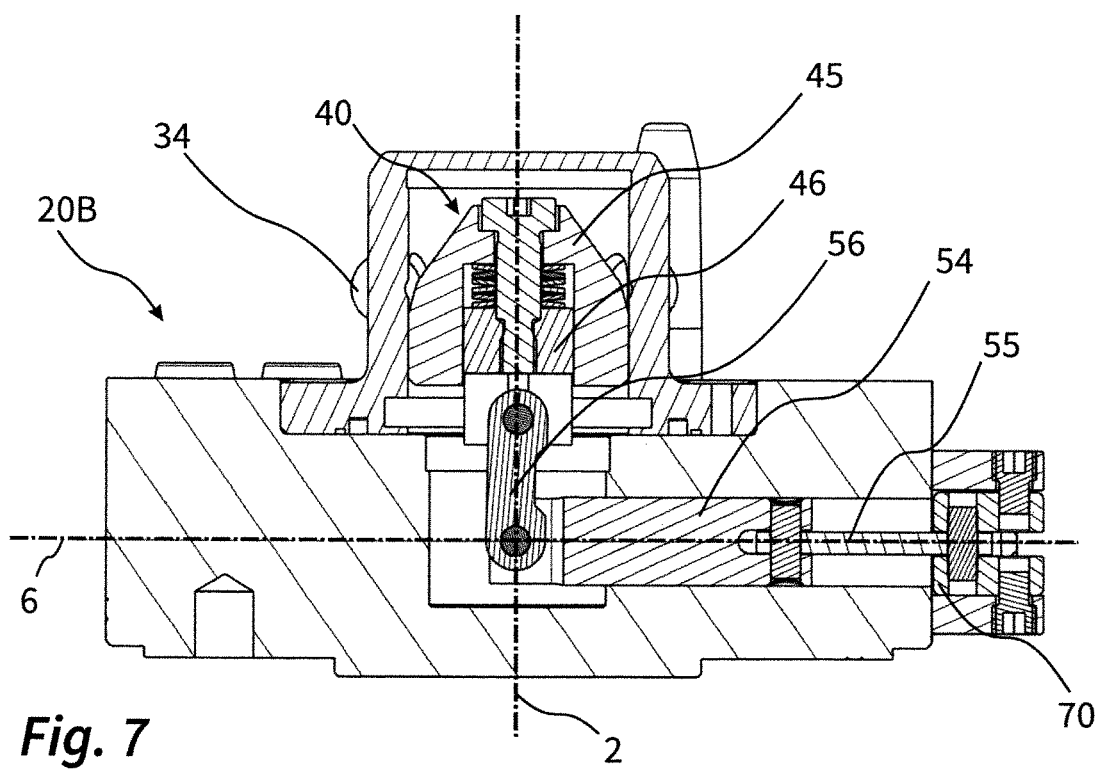
Figure 8:
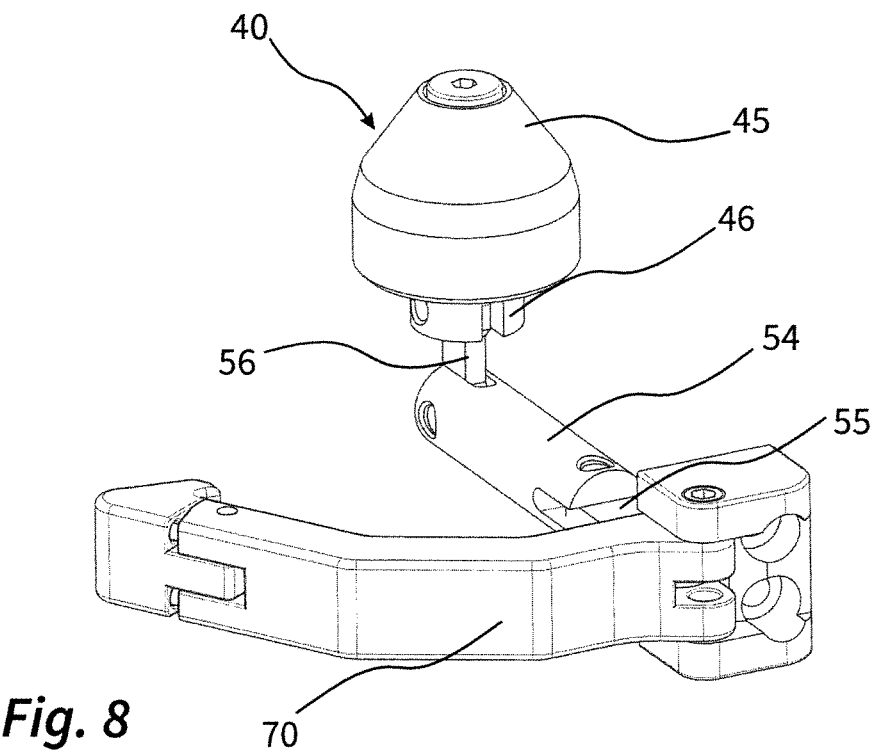

In the design of the coupling subdevice according to FIGS. 6 to 8, the basic construction of the coupling subdevice 20B is similar to that of FIGS. 2 to 4. Here, too, the coupling subdevice 20B has a housing 22 which, on an upper side, has an abutment surface 24 and alignment pins 26 and, in particular, the coupling socket 30 extending in the coupling direction. This is penetrated by ball channels 32, in which individual ball bodies 34 are positioned. Again, an actuating body 40 is provided, which is displaceable in a vertical direction of movement 2 and, in the upper end position, presses the ball bodies 34 radially outward, thereby establishing a locked state.

However, in the case of this design, displacement of the actuating body 40 is performed manually. For this purpose, a manual control lever 70 is provided on the outside of the housing 22. The manual control lever 70 is hinged to the outer side of the housing 22 so as to be pivotable about a pivot axis 4. The manual control lever 70 has a curved shape so that, in the applied state of FIG. 6, the manual control lever 70 hardly increases the outer dimensions of the coupling subdevice 20B.

The state of FIG. 6 is the state in which the actuating body 40 is positioned in the locking coupling end position. Similar to the embodiment of FIGS. 2 to 4, the movement transmission from the manual control lever 70 to the actuating body 40 is performed via a control element 54 which is displaceable within the housing 22 in a movement direction 6 transverse to the movement direction 2 of the actuating body 40. The control element 54 is connected to the manual control lever 70 via a compensating element 55. The control element 54 is connected to the actuating body 40 via a rigid link 56. The rigid link 56 is attached to the control element 54 so as to be pivotable about a pivot axis which is horizontal with respect to the figures, and is attached to a coupling body 46 of the actuating body 40 with the opposite end so as to be pivotable about a pivot axis which is also horizontal. The coupling body 46 is secured to the outer shell 45 by a screw penetrating an outer shell 45 of the actuating body 40.

If the manual control lever 70 is swiveled outward from the position of FIG. 6, the manual control lever 70 pulls the control element 54 outward via the compensating element 55. This also shifts the swivel axis of the link 56 there, which therefore also indirectly pulls the actuating body 40 downward. The consequence of this is that the ball bodies are no longer forced into the outer radial end position and thus the locking is discontinued.

In the locked state of FIG. 7, self-locking is provided similar to the previous design. If, in the state shown in FIG. 7, the mechanical connection to the manual control lever 70 is lost, for example due to breakage of the compensating element 55, a force acting downward on the actuating body 40 would nevertheless not be able to displace the actuating body 40 to any relevant extent, since the orientation of the link 56, which is aligned with the direction of movement 2, would prevent this.

Figure 9:
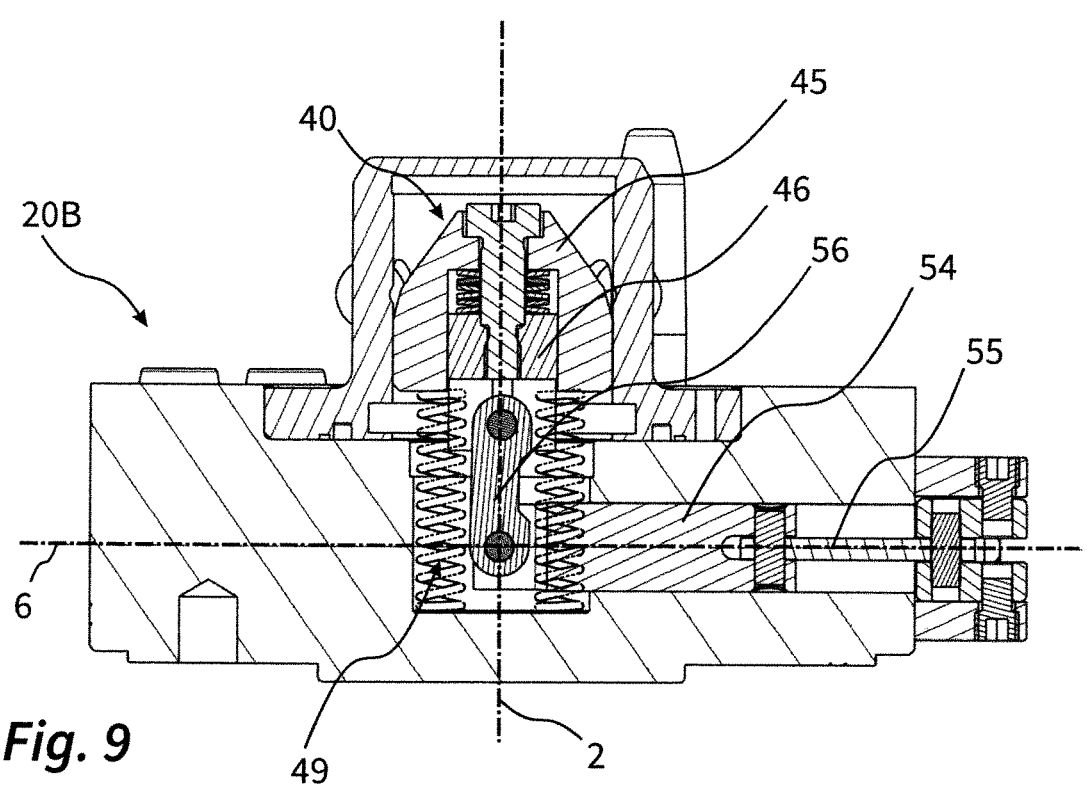

FIG. 9 shows that it is conceivable to equip a coupling subdevice 20B similar to FIG. 5 with a spring device 49. The spring device 49 fulfills the function of pressing the actuating body 40 in the direction of the locking end position. This reduces the risk that manual locking via the manual control lever 70 is incomplete and thus incorrect.

Figure 10:
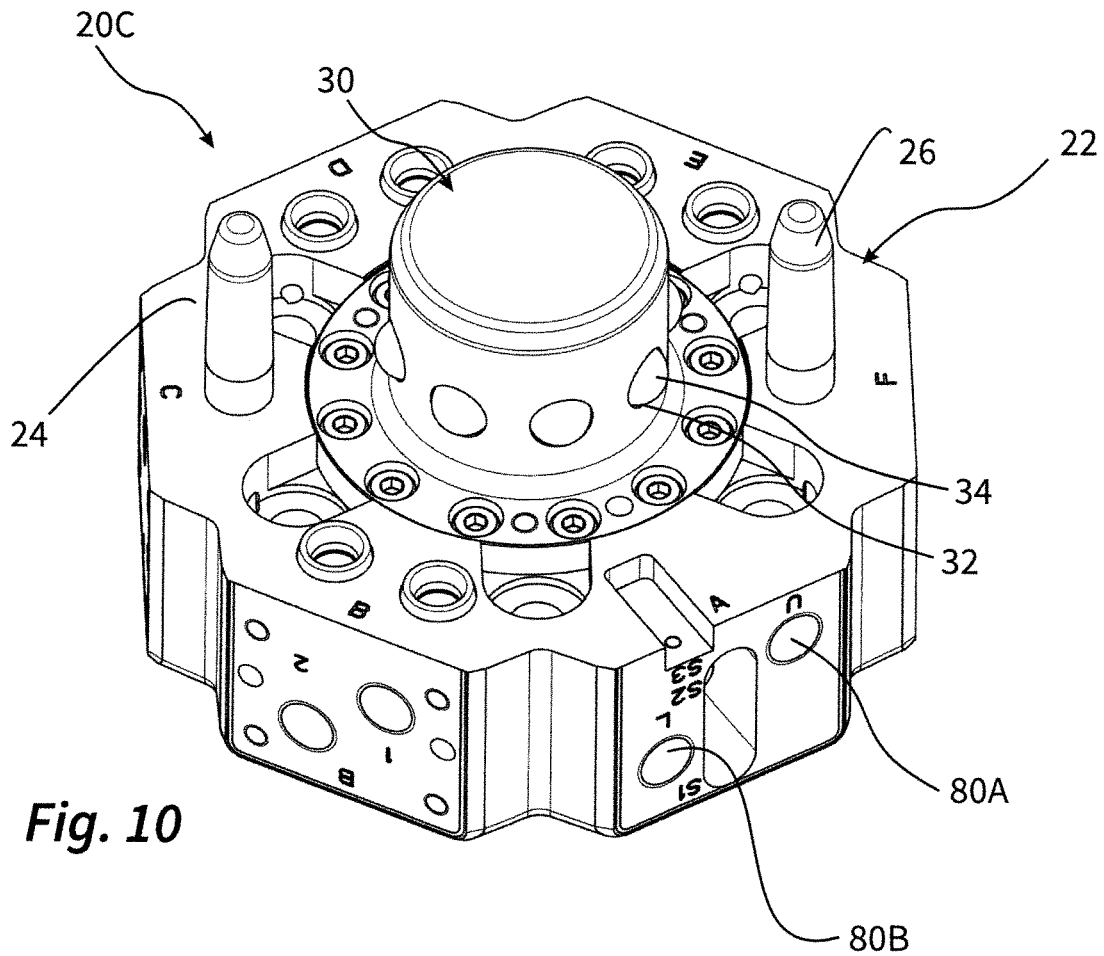
FIGS. 10 and 11 show a coupling subdevice of a tool coupling device with pneumatic actuation.
Figure 11:
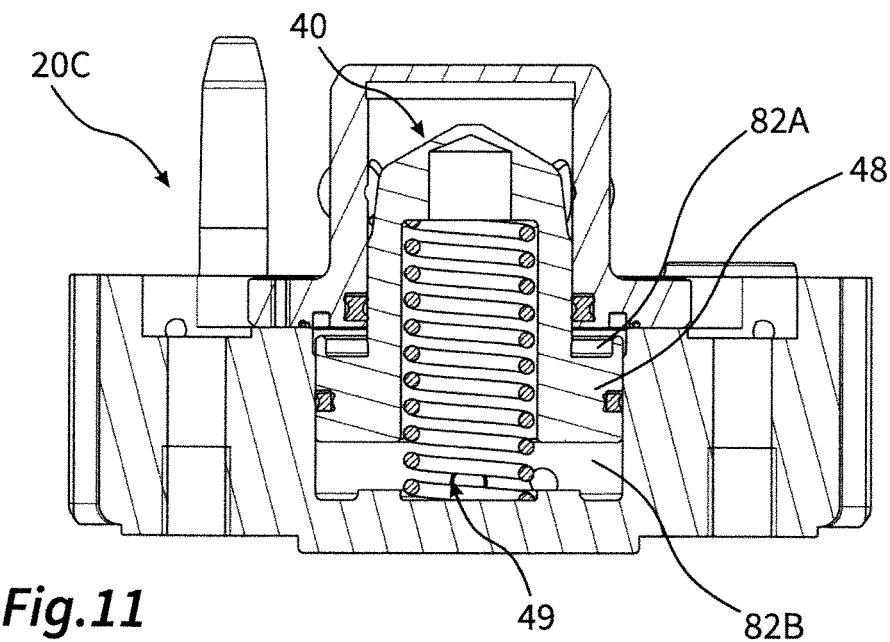

FIGS. 10 and 11 show a further variant of the coupling subdevice 20C. This third variant, equally to the other two variants, has a housing 22 with an abutment surface 24 surmounted by alignment pins 26 and a coupling socket 30. The coupling socket 30 also has the aforementioned ball channels 32 with ball bodies 34 contained therein. Again, an actuating body 40 is displaceably arranged within the coupling socket 30.

In this case, however, the displacement of the actuating body 40 is effected pneumatically. Two compressed air ports 80A, 80B are provided on the outside of the housing 22 and communicate with two piston chambers 82A, 82B in the housing. The two piston chambers 82A, 82B are arranged on either side of a piston section 48 which is part of the actuating body 40. Since this design does not require a mechanical connection to a control element 54, a spring device 49 in the form of a centric helical compression spring may instead be arranged on the underside of the actuating body 40. The helical compression spring permanently presses the actuating body 40 upwards into that end position in which the ball bodies 34 are pressed outwards and the locked state is accordingly established.

If the coupling subdevice 20C is to be decoupled, this is done by applying air pressure to the piston chamber 82A via the compressed air port 80A. If the pressure is sufficiently high, this is sufficient to displace the actuating body 40 downwards against the force of the spring device 49, so that the ball bodies 34 can then be moved radially inwards again and the locked state is thereby released.

Figure 12:
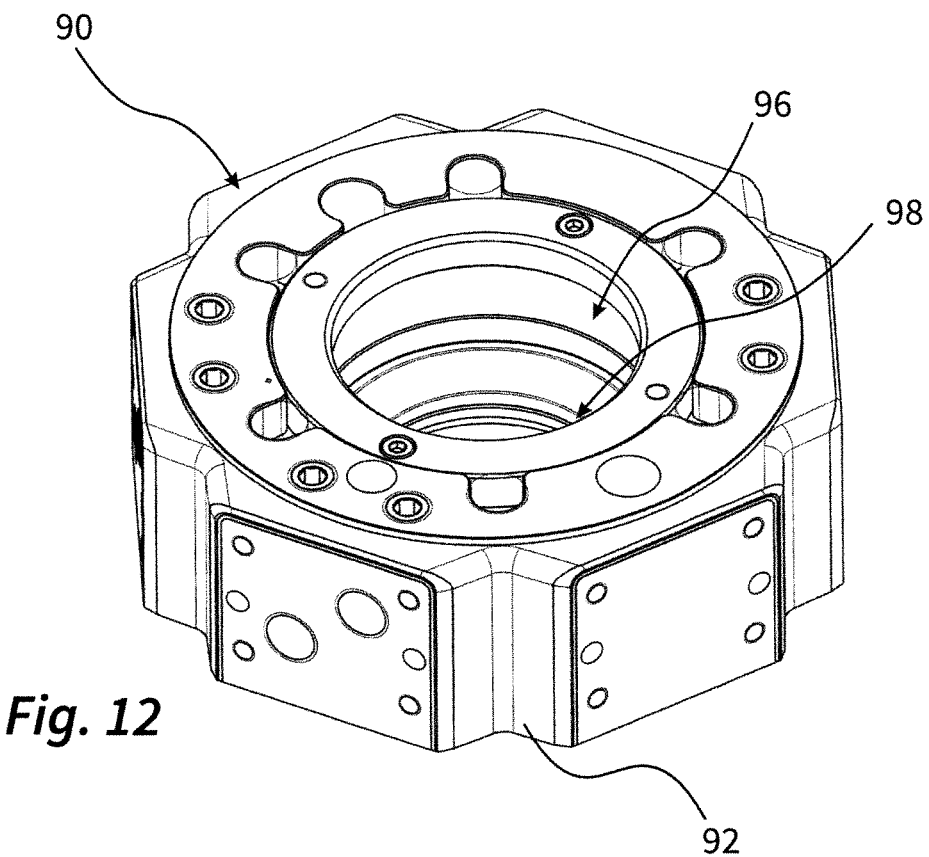
FIGS. 12 and 13 show a counter coupling subdevice which can be coupled to the coupling subdevices according to FIGS. 2 to 11 and locked thereto.
Figure 13:
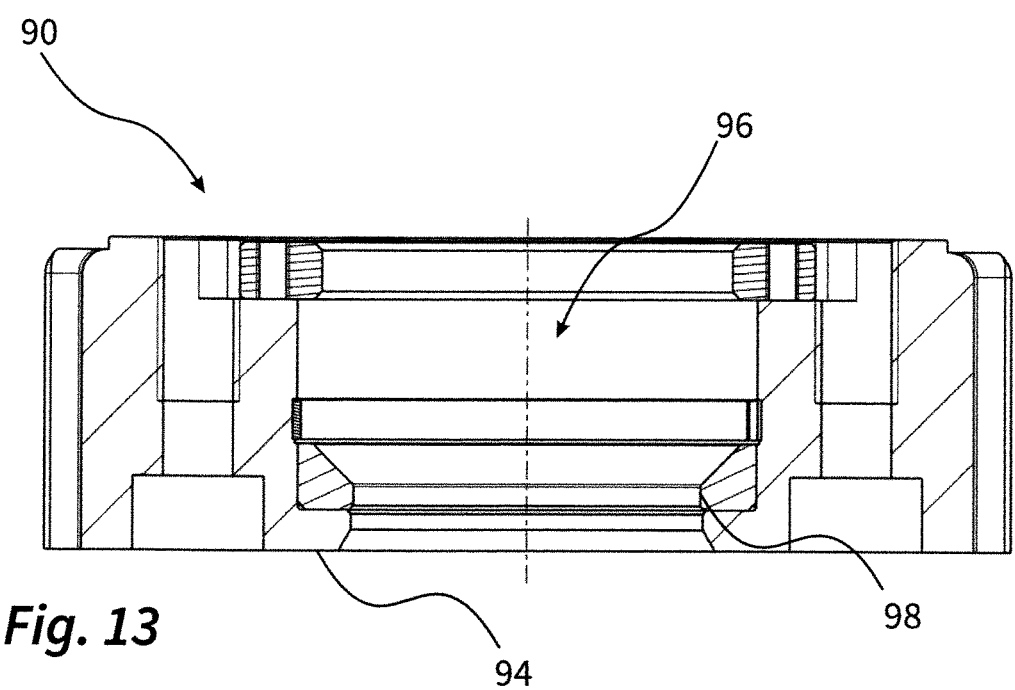

FIGS. 12 and 13 show the opposite second coupling subdevice 90, which is couplable and lockable with all three described variants 20A, 20B, 20C of the first coupling subdevice.

In accordance with the coupling subdevices 20A, 20B, 20C, the coupling subdevice 90 has a housing 92 which, with reference to the orientation of FIGS. 12 and 13, has an abutment surface 94 on an underside thereof. The coupling subdevice 90 further has a central coupling recess 96 which, in this case, is formed from an aperture. A retaining edge 98 is provided on the inner side of this coupling recess 96.

Figure 14:
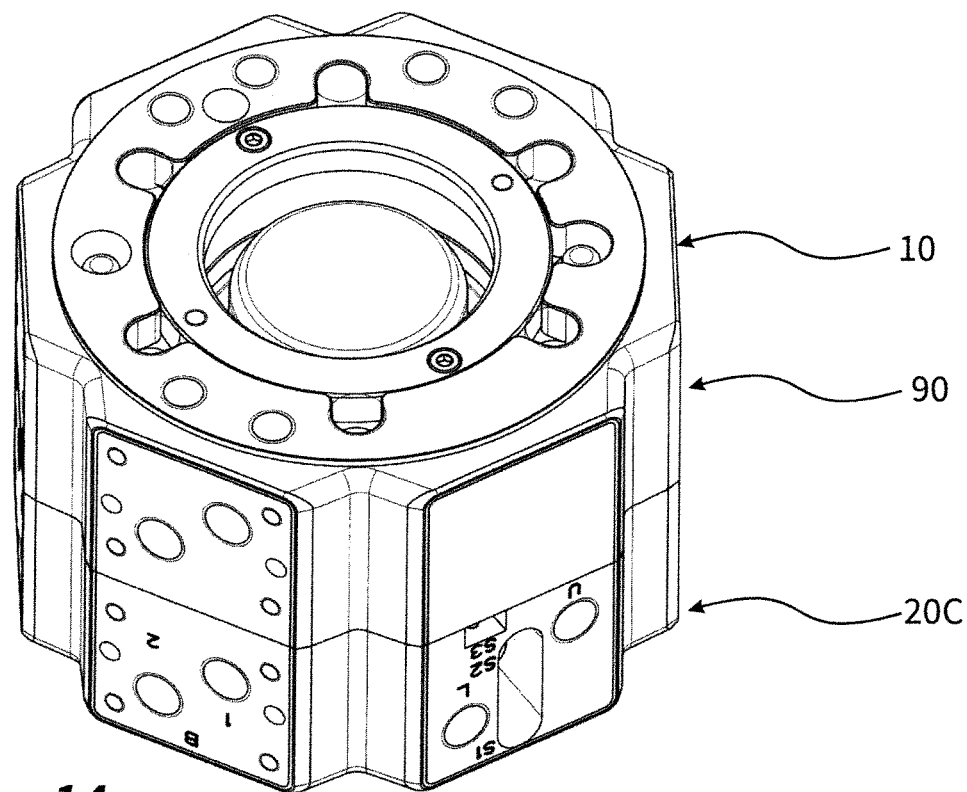
FIGS. 14 and 15 show two coupling subdevices in the coupled and locked state.
Figure 15:
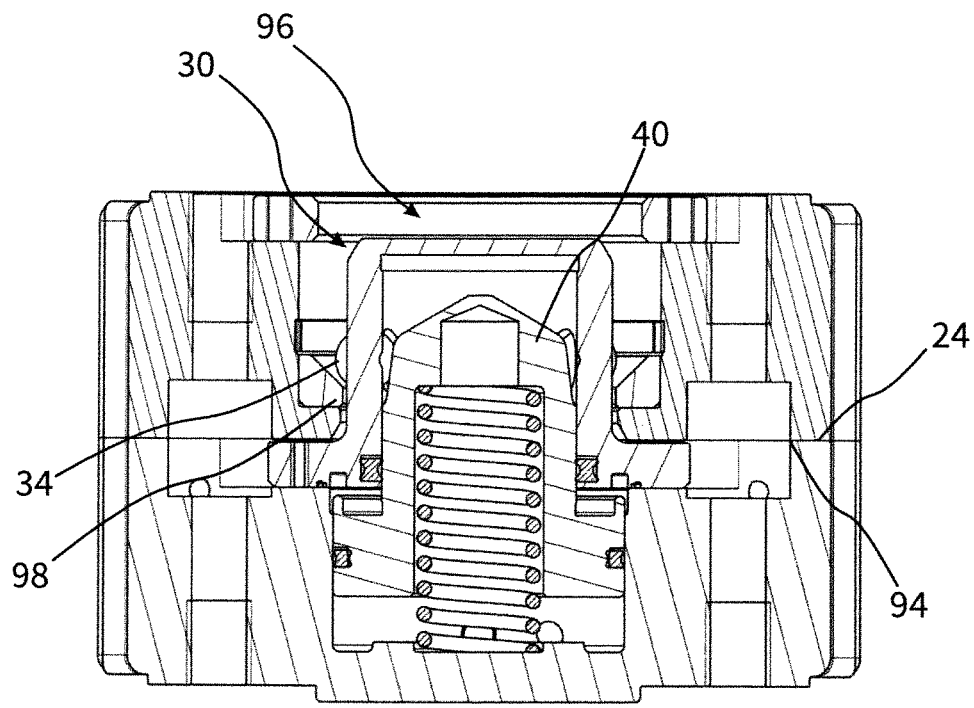

As FIG. 14 exemplarily shows with reference to the third variant 20C of the first coupling subdevice, the abutment surfaces 24, 94 of the coupling subdevices 20C, 90 come into flat contact with one another in the coupled state. The coupling socket 30 of the first coupling subdevice 20C extends into the coupling recess 96 and the ball bodies 34 engage behind the retaining edge 98, so that a locked state is established. Without a displacement of the actuating body 40, no separation of the coupling subdevices 90, 20C is possible starting from the coupled and locked state of FIGS. 14 and 15.

The second coupling subdevice 90 can also be coupled and locked to the other first coupling subdevices 20A, 20B as shown in FIG. 13. Therefore, a tool 120 equipped with a coupling subdevice 90 can be coupled to robot arms 110 manually, pneumatically or electrically in operation, depending on the type of coupling subdevice 20A, 20B, 20C provided on the robot arm 110.

Figure 16:
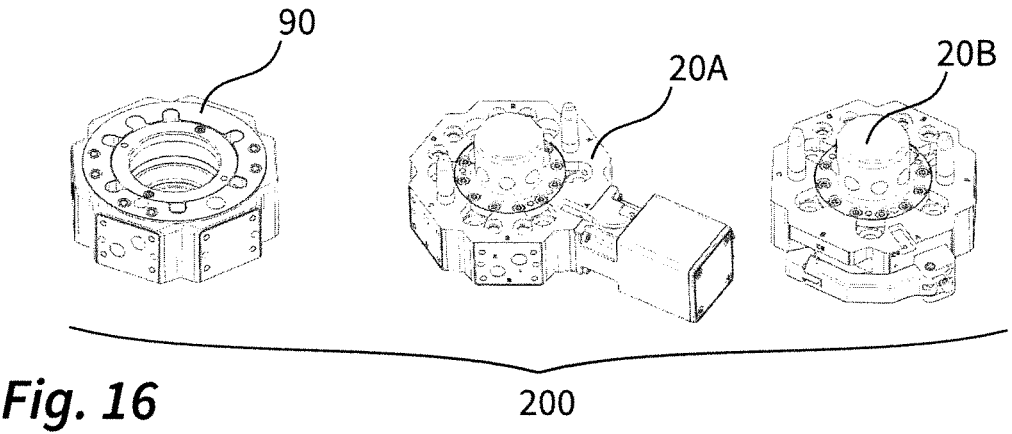
FIGS. 16 to 18 show various sets of coupling subdevices of FIGS. 2 to 15.
Figure 17:
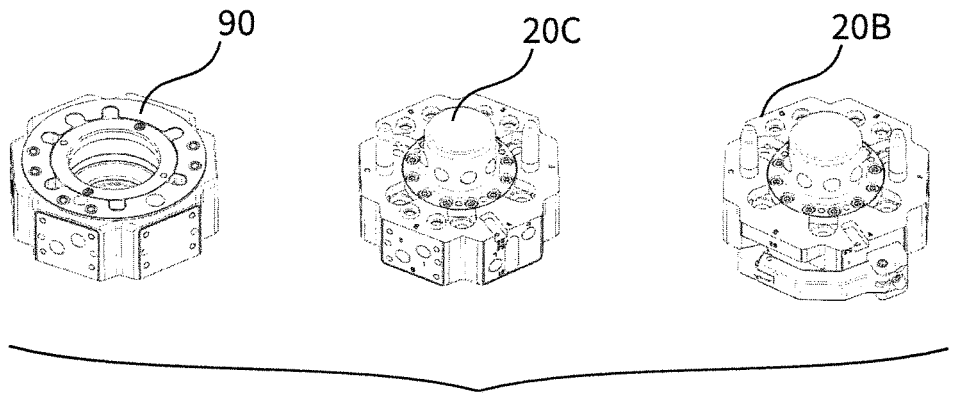
Figure 18:
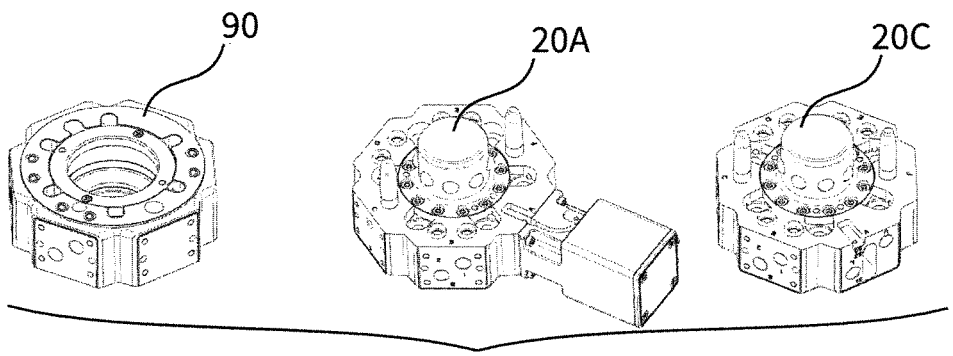

On this basis, the sets 200 of FIGS. 16 to 18 represent sets that can be used in practice. Although the sets 200 in the figures each show only one coupling subdevice of each type, a plurality of such coupling subdevices 90, 20A, 20B, 20C may each be included in such a set.

The sets of FIGS. 16 and 17 each represent sets with an electric or a pneumatic coupling subdevice 20A, 20C, and with a manual coupling subdevice 20B. Such a set is particularly suitable in applications in which some robots are almost continuously equipped with the same tool, so that a manual tool coupling device 10 is sufficient here, while alongside this robots are also used in which frequent tool changes take place, so that here the pneumatic or the electric variant 20A, 20C of the coupling subdevice on the robot side is advantageous. All coupling subdevices 20A, 20B, 20C can each be coupled and locked to the same tool-side coupling subdevice 90.

The set of FIG. 18 comprises both the electric variant of a coupling subdevice 20A and the pneumatic variant of a coupling subdevice 20C, each of which can be coupled to the same tool-side coupling subdevice 90. The joint use of coupling subdevice 20A, 20C for electrical or pneumatic coupling and locking can be expedient if different robot types are used, which are also different in terms of the availability of electrical connections or compressed air supply.

Figure 19:
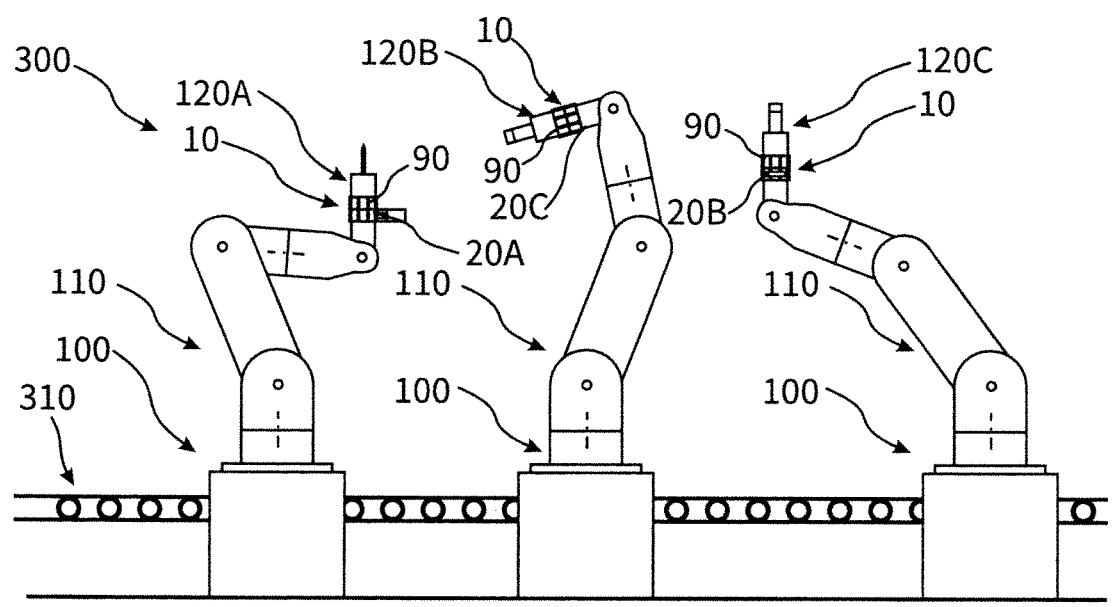
FIG. 19 shows a production line with several robots with tool coupling devices of the type described above.

FIG. 19 shows an example of a section of a production line 300 with a conveyor belt 310 next to which a plurality of robots 100 with robot arms 110 are arranged. The robots 100 each have different coupling subdevices 20A, 20B, 20C according to the previous description. Furthermore, the robots 100 each have different tools 120A, 120B, 120C.

Since the tools 120A, 120B, 120C are each provided with coupling subdevices 90 of identical design, the tools 120A, 120B, 120C are interchangeable. Thus, each of the robots of FIG. 17 can be coupled and interlocked with each of the tools 120A, 120B, 120C.

The invention claimed is:

1. A tool coupling device comprising:
    two coupling subdevices configured to be provided at a distal end of a robot arm of a robot and to be provided on a tool which can be coupled to the robot arm, wherein the coupling subdevices can be uncoupled from one another and coupled to one another for the purpose of changing tools;
    a first coupling subdevice of the two coupling subdevices has a coupling socket extending in a coupling direction for insertion into a coupling recess of a second coupling subdevice of the two coupling subdevices;
    the first coupling subdevice has a plurality of ball channels in the coupling socket, within each of which a ball body is arranged as a locking body, the ball bodies being movable between a radially extended coupling position and a radially retracted release position;
    the first coupling subdevice has an internal actuating body which is displaceable relative to the coupling socket and which, in a coupling end position, presses the plurality of ball bodies into the radially extended coupling position;
    the second coupling subdevice has at least one retaining edge on an inside of the coupling recess, so that when the coupling socket is inserted into the coupling recess and when the ball bodies are in their radially extended coupling position, the coupling subdevices are locked and separation of the coupling subdevices is prevented;
    the first coupling subdevice comprises an electric motor for displacing the actuating body;
    the first coupling subdevice comprises a linearly movable control element which is displaceable in a control element movement direction by the electric motor;
    the linearly movable control element acts on the actuating body via a direction changing gear unit;
    the direction changing gear unit comprises a guide surface on the actuating body, which is inclined with respect to the control element movement direction; and
    the linearly movable control element abuts the guide surface, so that the actuating body is indirectly displaced by displacement of the linearly movable control element;
    wherein the electric motor comprises an output shaft coupled to the linearly movable control element via a gear worm; and
    wherein the linearly movable control element is configured as a nut screwed on the gear worm.

2. The tool coupling device according to claim 1, wherein:
    at least four ball channels are provided; and/or
    the ball channels have different orientations and are evenly distributed over a circumference of the coupling socket.

3. The tool coupling device according to claim 1, further including:
   a spring device by which the actuating body is pressed in the direction of the coupling end position.

4. An industrial robot comprising:
   a robot arm; and
   a tool at a distal end of said robot arm, said tool being fixed and locked by the tool coupling device according to claim 1.

5. The tool coupling device according to claim 1, wherein the guide surface encloses an angle between 5° and 40° with respect to the control element movement direction.

6. The tool coupling device according to claim 1, wherein:
   the actuating body has an opening on an inside of which are guide grooves having the inclined guide surface; and
   the linearly movable control element is configured to engage in the guide grooves to thereby effect a linear displacement of the actuating body.

7. A tool coupling device comprising:
   two coupling subdevices configured to be provided at a distal end of a robot arm of a robot and to be provided on a tool which can be coupled to the robot arm, wherein the coupling subdevices can be uncoupled from one another and coupled to one another for the purpose of changing tools;
   a first coupling subdevice of the two coupling subdevices has a coupling socket extending in a coupling direction for insertion into a coupling recess of a second coupling subdevice of the two coupling subdevices;
   the first coupling subdevice has a plurality of ball channels in the coupling socket, within each of which a ball body is arranged as a locking body, the ball bodies being movable between a radially extended coupling position and a radially retracted release position;
   the first coupling subdevice has an internal actuating body which is displaceable relative to the coupling socket and which, in a coupling end position, presses the plurality of ball bodies into the radially extended coupling position;
   the second coupling subdevice has at least one retaining edge on an inside of the coupling recess, so that when the coupling socket is inserted into the coupling recess and when the ball bodies are in their radially extended coupling position, the coupling subdevices are locked and separation of the coupling subdevices is prevented;
   the first coupling subdevice has an externally located manual control lever for manual operation;
   the first coupling subdevice comprises a linearly movable control element which is displaceable in a control element movement direction by the externally located manual control lever; and
   the linearly movable control element acts on the actuating body via a direction changing gear unit such that the linearly movable control element and the actuating body move in different directions;
   wherein the direction changing gear unit is configured as a link gear unit having a rigid link which is pivotably connected to the linearly movable control element and pivotably attached to the actuating body.

8. The tool coupling device according to claim 7, wherein:
   the manual control lever is formed as a pivotable manual control lever.

9. The tool coupling device according to claim 8, wherein:
   the manual control lever is pivotable about a pivot axis which extends parallel to the coupling direction.

10. An industrial robot comprising:
    a robot arm; and
    a tool provided at a distal end of said robot arm, said tool being fixed and locked by the tool coupling device according to claim 7.

11. A system for manufacturing or handling workpieces comprising:
    at least two robots, each of the robots having at least one robot arm;
    the robot arms are each provided with a coupling subdevice which is designed for coupling to a third coupling subdevice, so that at least one tool coupled to the third coupling subdevice can be coupled to both coupling subdevices of the at least two robot arms;
    the coupling subdevices on the robot arms each have a coupling socket with a plurality of ball channels, within each of which a ball body is arranged, the ball bodies being movable between a radially extended coupling position and a radially retracted release position;
    the coupling subdevices on the robot arms each have an internal actuating body which is displaceable relative to the coupling socket and which, in a coupling end position, presses the plurality of ball bodies into the radially extended coupling position;
    the coupling subdevice on the tool has at least one retaining edge on an inside of the coupling recess, so that when the coupling socket is retracted into the coupling recess and when the ball bodies are radially extended, the coupling subdevices are locked and separation of the respective coupling subdevice is prevented; and
    the at least two coupling subdevices on the robot arms are configured to be coupled to the third coupling subdevice by different types of operation, wherein:
       at least one coupling subdevice of the at least two coupling subdevices is designed for coupling to the third coupling subdevice by actuation of an electric motor and at least one of the coupling subdevices of the at least two coupling subdevices is designed for coupling to the third coupling subdevice by manual actuation, or
       at least one coupling subdevice of the at least two coupling subdevices is designed for coupling to the third coupling subdevice by actuation by an electric motor and at least one of the coupling subdevices of the at least two coupling subdevices is designed for coupling to the third coupling subdevice by pneumatic actuation, or
       at least one coupling subdevice of the at least two coupling subdevices is adapted for coupling to the third coupling subdevice by manual operation and at least one of the coupling subdevices of the at least two coupling subdevices is adapted for coupling to the third coupling subdevice by pneumatic operation.

12. A tool coupling device set comprising:
    at least three coupling subdevices, of which at least two robot arm coupling subdevices of the at least three coupling subdevices are configured to be provided at a distal end of a robot arm and a tool coupling subdevice of the at least three coupling subdevices is configured to be provided with a tool which can be coupled to the robot arm;
    the robot arm coupling subdevices configured to be provided at the distal end of the robot arm each have a coupling socket for insertion into a coupling recess of the tool coupling subdevice;
    the robot arm coupling subdevices configured to be provided at the distal end of the robot arm each have the coupling socket with a plurality of ball channels, within each of which a ball body is arranged, the ball bodies being movable between a radially extended coupling position and a radially retracted release position;

the robot arm coupling subdevices configured to be provided at the distal end of the robot arm each have an internal actuating body which is displaceable relative to the coupling socket and which in a coupling end position presses the plurality of ball bodies into the radially extended coupling position;

the tool coupling subdevice has at least one retaining edge on an inside of the coupling recess, so that when the coupling socket is inserted into the coupling recess and when the ball bodies are radially extended, the coupling subdevices are locked and separation of the coupling subdevices is prevented; and the at least two robot arm coupling subdevices configured to be positioned at the distal end of the robot arm are configured to be coupled to the tool coupling subdevice by different types of operation, wherein:

one of the at least two robot arm coupling subdevices is adapted to be coupled to the tool coupling subdevice by actuation of an electric motor and another one of the at least two robot arm coupling subdevices is adapted to be coupled to the tool coupling subdevice by manual operation, or one of the at least two robot arm coupling subdevices is adapted to be coupled to the tool coupling subdevice by operation of an electric motor and another one of the at least two robot arm coupling subdevices is adapted to be coupled to the tool coupling subdevice by pneumatic operation, or one of the at least two robot arm coupling subdevices is adapted to be coupled to the tool coupling subdevice by manual operation and another one of the at least two robot arm coupling subdevices is adapted to be coupled to the tool coupling subdevice by pneumatic operation.

13. A tool coupling device comprising:

two coupling subdevices configured to be provided at a distal end of a robot arm of a robot and to be provided on a tool which can be coupled to the robot arm, wherein the coupling subdevices can be uncoupled from one another and coupled to one another for the purpose of changing tools;

a first coupling subdevice of the two coupling subdevices has a coupling socket extending in a coupling direction for insertion into a coupling recess of a second coupling subdevice of the two coupling subdevices;

the first coupling subdevice has a plurality of ball channels in the coupling socket, within each of which a ball body is arranged as a locking body, the ball bodies being movable between a radially extended coupling position and a radially retracted release position;

the first coupling subdevice has an internal actuating body which is displaceable relative to the coupling socket and which, in a coupling end position, presses the ball bodies into the radially extended coupling position;

the second coupling subdevice has at least one retaining edge on an inside of the coupling recess, so that when the coupling socket is inserted into the coupling recess and when the ball bodies are in their radially extended coupling position, the coupling subdevices are locked and separation of the coupling subdevices is prevented;

the first coupling subdevice comprises an electric motor for displacing the actuating body;

the first coupling subdevice comprises a linearly movable control element which is displaceable in a control element movement direction by the electric motor; and the linearly movable control element acts on the actuating body via a direction changing unit such that the linearly movable control element and the actuating body move in different directions;

wherein the direction changing unit is configured as a link gear unit having a rigid link which is pivotably connected to the linearly movable control element and pivotably attached to the actuating body.

* * * * *